US009762284B2

United States Patent
Alavi et al.

(10) Patent No.: US 9,762,284 B2
(45) Date of Patent: Sep. 12, 2017

(54) CIRCUITS AND SYSTEMS FOR TRANSMITTER CALIBRATION

(71) Applicant: Analog Devices, Inc., Norwood, MA (US)

(72) Inventors: Reza Alavi, Belle Mead, NJ (US); Saeed Aghtar, Hillsborough, NJ (US); Kenneth J. Keyes, Tinton Falls, NJ (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 15/092,422

(22) Filed: Apr. 6, 2016

(65) Prior Publication Data

US 2016/0294437 A1    Oct. 6, 2016

Related U.S. Application Data

(60) Provisional application No. 62/143,522, filed on Apr. 6, 2015.

(51) Int. Cl.

| H04L 25/03 | (2006.01) |
|---|---|
| H04B 1/525 | (2015.01) |
| H04B 1/12 | (2006.01) |
| H04B 17/14 | (2015.01) |

(52) U.S. Cl.
CPC .............. *H04B 1/525* (2013.01); *H04B 1/123* (2013.01); *H04B 17/14* (2015.01)

(58) Field of Classification Search
CPC ................. H03F 1/3247; H04L 27/368; H04L 25/03343; H04L 27/364; H04B 1/0483

USPC ........ 375/296, 316, 329, 340; 330/127, 149; 455/77, 114.3
See application file for complete search history.

(56) References Cited

U.S. PATENT DOCUMENTS

| 2007/0189371 A1 | 8/2007 | Yen |
| 2010/0022200 A1 | 1/2010 | Cole et al. |
| 2012/0002586 A1 | 1/2012 | Gainey et al. |
| 2013/0135045 A1* | 5/2013 | Khlat .................. H03G 1/04 330/127 |
| 2013/0272175 A1 | 10/2013 | Zargari et al. |

(Continued)

OTHER PUBLICATIONS

"International Application Serial No. PCT/US2016/026244, International Search Report mailed Jul. 27, 2016", 5 pgs.

(Continued)

*Primary Examiner* — Khai Tran
(74) *Attorney, Agent, or Firm* — Schwegman Lundberg & Woessner, P.A.

(57) ABSTRACT

A method of operating a radio frequency transceiver may include generating, by a transmit circuit of the transceiver, in-phase (I) and quadrature (Q) analog signals based on a digital calibration signal; mixing, by the transmit circuit, the I and Q analog signals with local oscillator (LO) and phase shifted LO signals to generate upconverted I and Q signals, the LO signal having a first frequency, and combining the upconverted I and Q signals to generate a combined signal; and converting, by a receive circuit of the transceiver, a signal based on the combined signal to a received digital signal using a sampling rate at a second frequency, the second frequency being less than the first frequency, wherein the converting downconverts frequency content in the combined signal.

26 Claims, 4 Drawing Sheets

(56) References Cited

U.S. PATENT DOCUMENTS

| | | | |
|---|---|---|---|
| 2013/0308693 A1 | 11/2013 | Li et al. | |
| 2014/0341263 A1 | 11/2014 | Wu et al. | |
| 2015/0333850 A1* | 11/2015 | Myoung | H04B 17/11 455/84 |
| 2015/0350000 A1* | 12/2015 | Chang | H04L 27/364 375/227 |

OTHER PUBLICATIONS

"International Application Serial No. PCT/US2016/026244, Written Opinion mailed Jul. 27, 2016", 4 pgs.

* cited by examiner

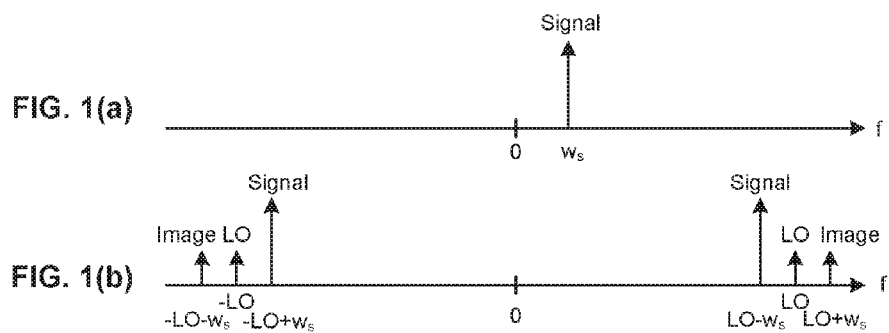
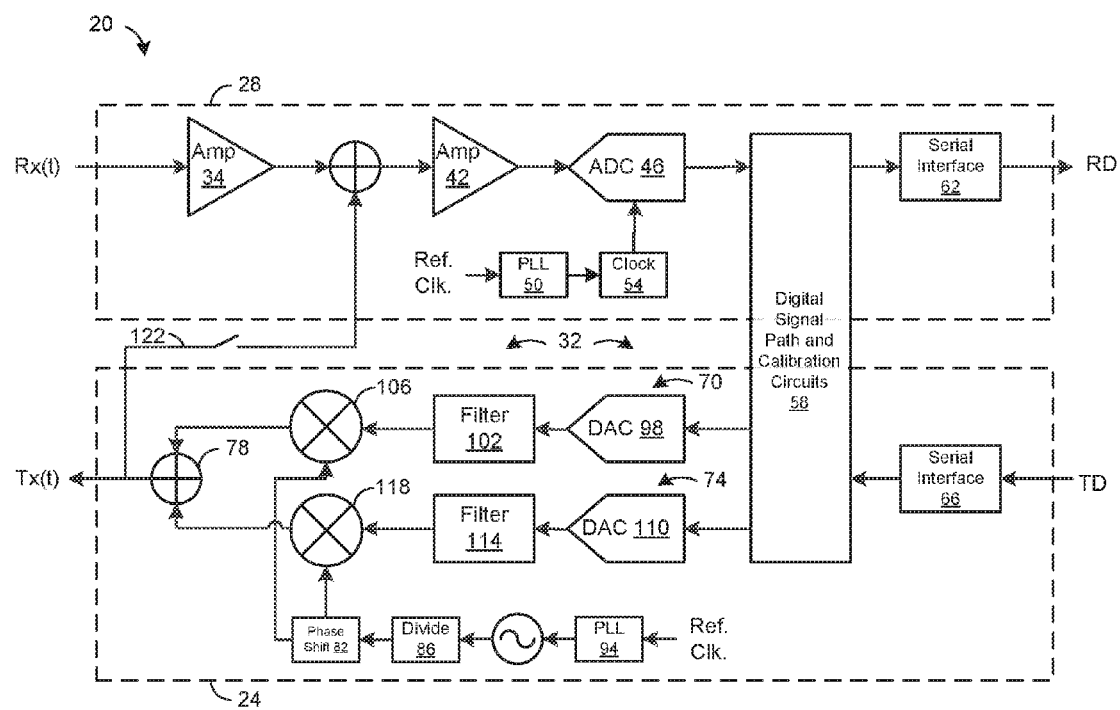
FIG. 2

CIRCUITS AND SYSTEMS FOR TRANSMITTER CALIBRATION

CROSS-REFERENCE TO RELATED APPLICATIONS

This application claims priority to U.S. Provisional Patent Application No. 62/143,522, filed on Apr. 6, 2015, which is hereby incorporated by reference in its entirety.

BACKGROUND INFORMATION

Radio frequency (RF) transmitters typically suffer from non-idealities associated with a local oscillator (LO) and in-phase (I) and quadrature (Q) signal paths that degrade transmission performance. LO leakage includes unintended generation of frequency content in the transmitted signal at the LO frequency. Such leakage occurs through various mechanisms, including due to insufficient isolation in the up-converter mixer resulting in the LO frequency leaking from the LO port of the mixer to the output of the mixer, and from residual DC offsets in the IQ signal paths at the input of the mixer mixing with the LO frequency. IQ impairment involves unintended generation of image frequency content in the transmitted signal. Such impairment occurs as a result of phase and gain mismatches of the in-phase and quadrature signal paths and up-converter mixers.

FIG. 1(a) depicts an embodiment of a frequency domain view of a signal to be transmitted by the transmitter. The signal includes frequency content at a signal frequency. FIG. 1(b) depicts an embodiment of a frequency domain view of a signal transmitted by a transmitter suffering from LO leakage and IQ impairment. The transmitted signal includes intended frequency content at the upconverted signal frequency as well as unintended frequency content at the LO frequency and the image frequency.

Therefore, a need exists for circuits and systems to calibrate transmitters to correct for LO leakage and IQ impairments, preferably while minimizing any further non-idealities and/or required circuitry in a calibration path of a receiver of a transceiver containing the transmitter.

BRIEF DESCRIPTION OF THE DRAWINGS

So that features of the present invention may be understood, a number of drawings are described below. However, the appended drawings illustrate only particular embodiments of the invention and are therefore not to be considered limiting of its scope, for the invention may encompass other equally effective embodiments.

FIGS. 1(a)-1(b) are graphs depicting frequency domain representations of embodiments of a signal to be transmitted by a transmitter, and signals of a transmitter suffering from LO leakage and IQ impairment, respectively.

FIG. 2 is a schematic diagram depicting an embodiment of a radio frequency transceiver circuit.

DETAILED DESCRIPTION OF EXAMPLE EMBODIMENTS

Figure 3:
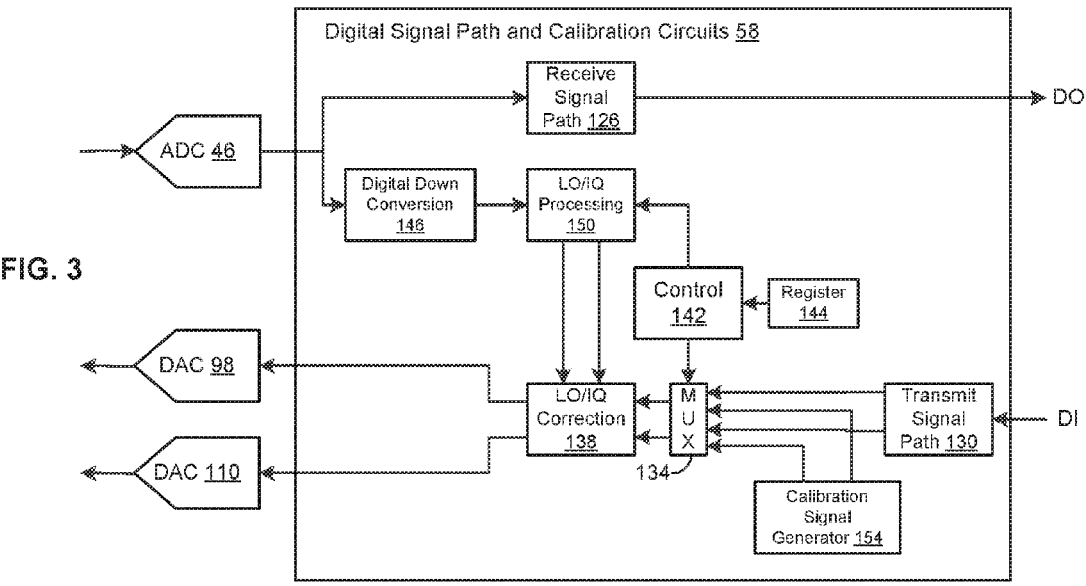
FIG. 3 is a schematic diagram depicting an embodiment of digital signal path and calibration circuits of the transceiver circuit.

Embodiments of a radio frequency transceiver circuit and a method of operating the transceiver circuit may provide an improved calibration of a transmitter circuit of the transceiver circuit to correct for LO leakage IQ impairments of the transmitter.

The radio frequency transceiver circuit may include a transmit circuit, a receive circuit and a calibration circuit. The transmit circuit may generate in-phase (I) and quadrature (Q) analog signals based on a digital signal, mix the I and Q analog signals with local oscillator (LO) and phase shifted LO signals to generate upconverted I and Q signals, and combine the upconverted I and Q signals to generate a combined signal. The LO signal may be at a first frequency. The receive circuit may receive the combined signal through a loop back from the transmit circuit, and convert an analog signal based on the combined signal to a received digital signal using a sampling rate at a second frequency. The second frequency may be less than a Nyquist frequency associated with the first frequency, such as less than the first frequency, so that the converting downconverts frequency content in the combined signal. The calibration circuit may calculate channel state information and correction factors as a function of the received digital signal, the correction factors correcting for at least one of LO leakage or IQ impairment.

The radio frequency transceiver circuit thus may provide a path for calibration signals through the transmit and receive circuits that avoids imparting non-idealities in the receive circuit by downcoverting a signal looped back from the transmitter circuit using a subsampling converter instead of a mixer, simplifying the calculation of the I and Q correction factors to correct for LO leakage or IQ impairment in the transmitter circuit by avoiding to the need to also correct for such non-idealities of the receive circuit.

In a method of operating the transceiver circuit, the transmit circuit may generate the I and Q analog signals based on the digital calibration signal, mix the I and Q analog signals with the LO and phase shifted LO signals to generate the upconverted I and Q signals, and combine the upconverted I and Q signals to generate the combined signal. The LO signal may be at the first frequency. The receive circuit may convert a looped back signal based on the combined signal to a received digital signal using a sampling rate at the second frequency, the second frequency being less than the Nyquist frequency associated with the first frequency, such as less than the first frequency, so that the converting downconverts frequency content in the combined signal. A calibration circuit may calculate the correction factors as a function of the received digital signal, the correction factors correcting for at least one of LO leakage or IQ impairment.

In embodiments, to calibrate for LO leakage, the transmit circuit may generate the combined upconverted I and Q signals based on a first digital calibration signal, and the calibration circuit may calculate channel state information based on the digital signal resulting from the subsampling conversion by the receive circuit. The first digital calibration signal may be a real DC signal. The transmit circuit may then generate the combined upconverted I and Q signals based on a second digital calibration signal, and the calibration circuit may calculate the correction factors to correct for LO leakage based on the digital signal resulting from the subsampling conversion by the receive circuit and the calculated channel state information. The second digital calibration signal may be a complex tone.

To calibrate for IQ impairment, the transmit circuit again may generate the combined upconverted I and Q signals based on a first digital calibration signal, and the calibration circuit may calculate channel state information based on the digital signal resulting from the subsampling conversion by the receive circuit. The first digital calibration signal may be a real tone. The transmit circuit may then generate the combined upconverted I and Q signals based on a second digital calibration signal, and the calibration circuit may calculate the correction factors to correct for IQ impairment based on the digital signal resulting from the subsampling conversion by the receive circuit and the calculated channel state information. The second digital calibration signal may be a complex tone.

FIG. 2 depicts an embodiment of a radio frequency transceiver circuit 20 providing improved calibration of a transmitter circuit 24 to account for non-idealities such as LO leakage and IQ impairment. The transceiver 20 may include a receive circuit 28, a transmit circuit 24, and a calibration circuit 32.

The receive circuit 24 may include one or more amplifiers 34, 42, a summing circuit 38, an analog to digital converter 46, a phase locked loop (PLL) circuit 50, a clock circuit 54, portions of a digital signal path and calibration circuit 58, and a serial interface 62. The transmit circuit 24 may include a serial interface 66, portions of a digital signal path and calibration circuit 58, an in-phase signal path circuit 70, a quadrature signal path circuit 74, a summing circuit 78, a phase shift circuit 82, a frequency divider circuit 86, a LO circuit 90, and a PLL circuit 94. The in-phase signal path circuit 70 may include a digital to analog converter 98, a filter 102, and a mixer 106. The quadrature signal path circuit 74 may include a digital to analog converter 110, a filter 114, and a mixer 118. The calibration circuit 32 may include a loop-back signal path circuit 122 from the transmitter to the receiver, and portions of the digital signal path and calibration circuit 58.

The transceiver circuit 20 may operate to transmit data as follows. The transmitter serial interface 66 may receive digital data to be transmitted. The digital signal path and calibration circuit 58 may convert the digital data to I and Q components, modify the I and Q components to compensate for transmit LO leakage and IQ mismatches in accordance with correction factors determined by a calibration process, and provide the modified I and Q components to I and Q signal paths. The respective digital-to-analog converters 98, 110 of the I and Q signal paths may convert the I and Q components to analog signals. The respective filters 102, 114 may filter the converted components. The respective mixers 106, 118 may up-convert the filtered components by mixing the components with a corresponding unshifted or shifted LO frequency signal provided by the phase shift circuit 82, frequency divider circuit 86, LO circuit 90 and PLL circuit 94. The summing circuit 78 may sum the mixed I and Q components to generate a combined transmit signal. The transmit signal Tx(t) may be provided to an antenna for transmission. In embodiments, the transmit signal may optionally be further up-converted to even higher frequencies before transmission over the air.

The transmit signal may be in a transmit frequency range as a function of the frequency of the LO signal and the frequency content of the data signal to be transmitted. The LO signal may be at a first frequency selected to generate a transmit signal in a predetermined transmit frequency range. The bandwidth of the data signal to be transmitted may be relatively small in comparison to the first frequency, and the frequency range of the transmit signal thus may be mostly determined by the first frequency. In one embodiment, the first frequency may be selectable in a range between about 1.8 GHz and about 2.3 GHz, and the transmit frequency range may be a channel with a bandwidth determined by the data signal in this range between about 1.8 GHz and about 2.3 GHz.

The transceiver 20 may operate to receive data as follows. The receiver 28 may receive an incoming signal Rx(t), such as from an antenna. The receiver amplifiers 34, 42 may amplify the received signal. The analog-to-digital converter 46 may digitize the amplified signal using a specified sampling rate. The digital signal path and calibration circuit 58 may process the digitized data. The serial interface 66 may output the processed data as a received data signal.

The receive frequency range may be different than the transmit frequency range, such as lower than the transmit frequency range, and even substantially lower than the transmit frequency range. The sampling rate of the analog-to-digital converter 46 may be at a second frequency selected to have a predetermined relationship to the receive frequency range, such as above a Nyquist frequency associated with a receive frequency range of the received signal. In one embodiment, the received signal may be in a receive frequency range between about 300 MHz and about 800 MHz, and the sampling rate may be second frequency may be above a corresponding Nyquist frequency of 1.6 GHz, such as about 2 GHz.

FIG. 3 depicts an embodiment of a portion of the transceiver 20 showing the digital signal path and calibration circuit 58 in greater detail. The digital signal path and calibration circuit 58 may include components providing functionality for one or more of the receive circuit, transmit circuit and calibration circuit.

To provide receive circuit functionality, the digital signal path and calibration circuit 58 may include a receive signal path circuit 126 to receive, process and provide to the serial interface 62 the digitized receive data.

To provide transmit circuit functionality, the digital signal path and calibration circuit 58 may include a transmit signal path circuit 130, a multiplexer 134, a LO/IQ correction module 138, a controller 142, and a parameter register 144. The transmit signal path circuit 130 may receive a digital data signal to be transmitted, and generate corresponding I and Q components representing the data signal. The multiplexer 134 may receive and selectively pass the I and Q transmit data from the transmit signal path circuit 130 during operation to transmit data. The LO/IQ correction module 138 may receive I and Q correction factors and perform corrections to the I and Q data to be transmitted using the received correction factors. The controller 142 may control operation of components of the digital signal path and calibration circuit 58 to perform the functions discussed herein. The parameter register 144 may store parameters controlling selectable features of operation of the transmit circuit 24.

To provide calibration circuit functionality, the digital signal path and calibration circuit 58 may include a digital down conversion module 146, a LO/IQ processing module 150, the LO/IQ correction module 138, the controller 142, the parameter register 144, and a calibration signal generator 154. The digital down conversion module 146 may receive the subsampled calibration data resulting from the calibration signal and perform a further digital down conversion and filtering. The LO/IQ processing module 150 may receive the digitally down converted calibration data and calculate channel state information and LO and IQ correction factors. The LO/IQ correction module 138 may receive the LO and IQ correction factors and perform corrections to transmit data using the received correction factors during operation to transmit data. The multiplexer 134 may receive and selectively pass calibration data from a calibration signal generator 154 during operation to calibrate the transmitter. The controller 142 may control operation of components of the digital signal path and calibration circuit 58 to perform the various functions discussed herein. The parameter register 144 may store parameters controlling selectable features of operation of the calibration circuit 32.

Figure 4:
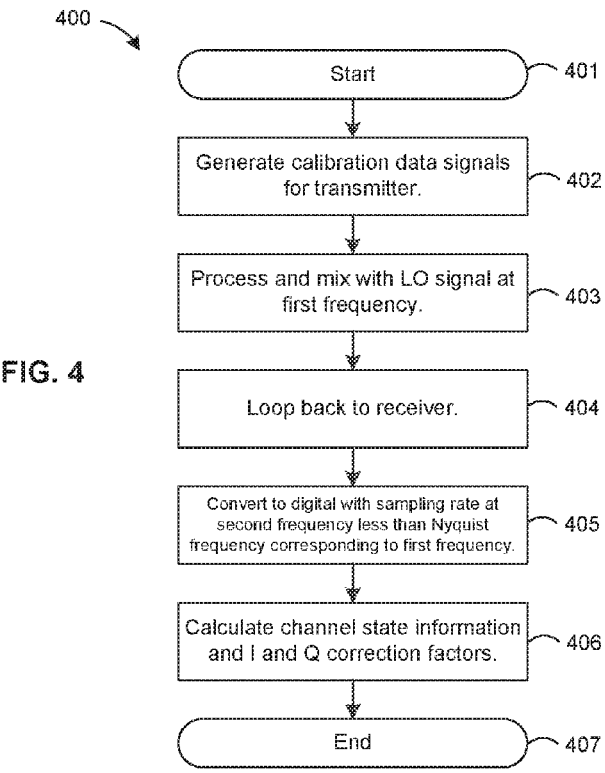
FIG. 4 is a flowchart depicting an embodiment of a method of calibrating a transmitter of the transceiver.

FIG. 4 depicts an embodiment of a method to calibrate the transmitter to account for nonidealities such as LO leakage and IQ impairment in an improved manner. The method may start at step 401. At step 402, the digital signal path and calibration circuit 58 may generate calibration signals. For example, the calibration signal generator 154 may generate I and Q components of a selected calibration signal, the multiplexer 134 may pass the calibration signal instead of the transmit signal under control of the controller, which may pass through or around the correction module 138.

At step 403, the transmit circuit 24 may process, upconvert and combine the I and Q components produced by the calibration signal. For example, much as in operation to transmit data, the digital signal path and calibration circuit 58 may provide the calibration signals as I and Q components to the I and Q signal paths, where respective digital-to-analog converts 98, 110 may convert each of the I and Q components to an analog signals, respective filters 102, 114 may filter the converted signals, and respective mixers 106, 118 may mix the filtered signals with a corresponding unshifted or shifted LO signal at the first frequency, and the summing circuit 78 may add the mixed signals to generate the calibration signal in the transmit frequency range.

At step 404, the combined calibration signal may be provided by the loop-back circuit 122 to the receiver 28, such as one or more amplifiers 42 of the receiver 28, instead of being provided to the antenna for transmission.

At step 405, the analog to digital converter 46 of the receive circuit 28 may digitize the received data using the sampling rate at the second frequency. In addition to being above a Nyquist frequency associated with a receive frequency range of the received signal, the selection of the second frequency may also select the second frequency be below a Nyquist frequency corresponding to data at the first frequency, such as data in the transmit frequency range. In one embodiment, the second frequency may be selected to be less than the first frequency. Therefore, unlike in operation of the transceiver to receive data, because the calibration signal is at the transmit first frequency range, but sampling is performed using the sampling rate at a second frequency below the Nyquist frequency corresponding the transmit frequency range, such as below the first frequency, the analog-to-digital converter 46 performs a subsampling of the calibration data to thereby downconvert the calibration data by an amount equal to the second frequency. This may avoid the need to use a mixer to downconvert the signal produced by the calibration signal, thereby avoiding the introduction of any further non-idealities resulting from such mixing and simplifying the calculation of the I and Q correction factors.

Figure 5A:
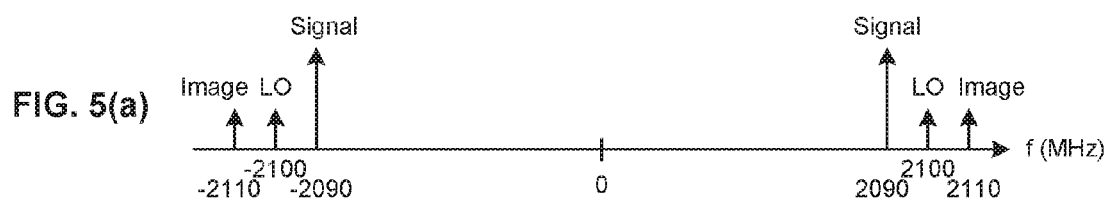
FIGS. 5(a)-5(b) are graphs depicting frequency domain representations of embodiments of a calibration signal provided to an analog-to-digital converter of a receiver of the transceiver circuit, and the calibration signal after subsampling by the analog to digital converter, respectively.
Figure 5B:
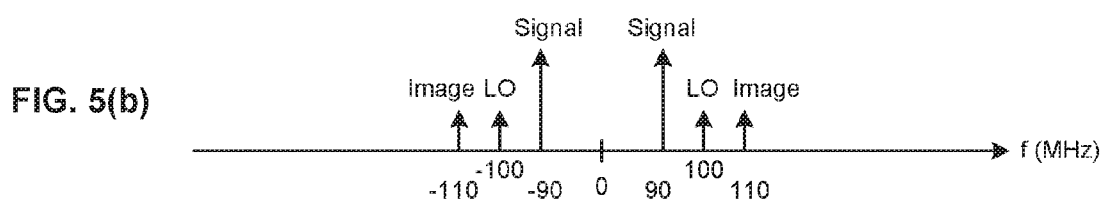

To illustrate the downcoversion performed by subsampling, FIG. 5(a) depicts an embodiment of a frequency domain view of the signal provided to the analog-to-digital converter 46 during calibration, showing frequency content at the signal, LO and image frequencies, and FIG. 5(b) depicts an embodiment of a frequency domain view of the signal after subsampling by the analog-to-digital converter 46, with shifting of the frequency content down by an amount corresponding to the sampling frequency.

At step 406, the digital signal path and calibration circuit 58 may process the digitized calibration data to further digitally down convert the calibration data and generate the correction data for calibrating the transmitter 24 to correct for LO leakage and IQ mismatch during operation to transmit data.

For calculation of the correction factors, the following models of the transmitter operation may be considered. The LO input to the mixers 106, 118 may be represented to model the IQ impairments according to the following equations:

$$m(t) = \cos(w_c t + \alpha) - jg\sin(w_c t + \alpha + \phi) \quad (1)$$

$$= \left(\frac{1 - ge^{j\phi}}{2}\right)e^{j(w_c t+\alpha)} + \left(\frac{1 + ge^{-j\phi}}{2}\right)e^{-j(w_c t+\alpha)} \quad (2)$$

$$= k_1 e^{j(w_c t+\alpha)} + k_2 e^{-j(w_c t+\alpha)} \quad (3)$$

In these equations, m(t) represents the sum of the LO inputs to the mixers, $w_c$ represents the LO frequency, g represents a gain mismatch of the in-phase and quadrature signal paths, α represents a starting phase, Φ represents a phase mismatch between the in-phase and quadrature signal paths, and k1 and k2 represent the indicated factors.

The in-phase and quadrature input signals may be represented according to the following equations:

$$s(t)=\cos(w_s t+\theta)+j\sin(w_s t+\theta) \quad (4)$$

In this equation, s(t) represents the sum of the in-phase and quadrature signals, and $w_s$ represents the signal frequency.

The transmitted signal may thus be represented to model the IQ impairments according to the following equations:

$$t_x(t)=2*re(m(t)\cdot s(t)) \quad (5)$$

$$=k_1 e^{j((w_c+w_s)t+\alpha+\theta)}+k_2 e^{-j((w_c-w_s)t+\alpha-\theta)}+k_1 {}^* e^{-j((w_c+w_s)t+\alpha+\theta)}+k_2 {}^* e^{j((w_c-w_s)t+\alpha+\theta)} \quad (6)$$

In these equations, $t_x(t)$ represents the combined transmit signal. This transmit signal may be further modified by adding two terms representing the LO leakage as shown below:

$$\varepsilon\cos(w_c t + \alpha) + \delta\sin(w_c t + \alpha + \phi) \quad (7)$$

$$=\left(\frac{\varepsilon - j\delta e^{j\phi}}{2}\right)e^{j(w_c t+\alpha)} + \left(\frac{\varepsilon + j\delta e^{-j\phi}}{2}\right)e^{-j(w_c t+\alpha)} \quad (8)$$

In these equations, ε models LO leakage in the in-phase signal path and δ models LO leakage in the quadrature signal path.

The overall transmit signal may be represented by the following equation:

$$t_x(t) = k_1 e^{j((w_c+w_s)t+\alpha+\theta)} + k_2 e^{-j((w_c-w_s)t+\alpha-\theta)} + k_1^* e^{-j((w_c+w_s)t+\alpha+\theta)} + \qquad (9)$$

$$k_2^* e^{j((w_c-w_s)t+\alpha-\theta)} + \left(\frac{\epsilon - j\delta e^{j\phi}}{2}\right) e^{j(w_c t+\alpha)} + \left(\frac{\epsilon + j\delta e^{-j\phi}}{2}\right) e^{-j(w_c t+\alpha)}$$

This representation of the transmit signal includes six components, which correspond to the six signal, image and LO frequency components produced by the transmitter demonstrating LO leakage and IQ impairment non-idealities. The component corresponding to the LO frequency, and thus representing the LO leakage, is proportional to:

$$\left(\frac{\epsilon - j\delta e^{j\phi}}{2}\right) = \frac{\epsilon - \delta\sin(\phi) - j\delta\cos(\phi)}{2} \qquad (10)$$

The component corresponding to the image frequency, and thus representing the IQ impairment, is proportional to:

$$\left(\frac{1 - g e^{j\phi}}{2}\right) = \frac{1 - g\cos(\phi) - jg\sin(\phi)}{2} \qquad (11)$$

During calibration, the digital down conversion performed by the digital signal path and calibration circuit may produce the following DC components:

$$\rho \frac{1 - g\cos(\phi) - jg\sin(\phi)}{2} e^{j(\alpha 1+\theta)} + w(t) \qquad (12)$$

$$\rho \frac{\epsilon + \delta\sin(\phi) + j\delta\cos(\phi)}{2} e^{j\alpha 1} + w(t) \qquad (13)$$

In these terms, w(t) represents noise. The average real and imaginary portions of the first of the above components are thus proportional to the gain and phase mismatches produced by IQ impairment. The average real and imaginary portions of the second of the above components are thus proportional to the LO leakage components. The digital down conversion process also may up-convert the receiver's inherent DC signal, eliminating a need to estimate and compensate for this DC signal as is required in other schemes.

Detected metrics that quantize the effects of LO leakage and IQ impairment, i.e., the quantities $\epsilon$, $\delta$, $g$, and $\Phi$, are therefore rotated by a phasor $e^{j\alpha 1}$ in the case of LO leakage and by a phasor $e^{j(\alpha 1+\theta)}$ in the case of IQ impairment, and scaled by a loop gain $\rho$. Estimation of this channel state information, which characterizes the channel formed by the transmit circuit, receive circuit and loopback circuit, including the phase rotation $\alpha 1$ and loop gain $\rho$ to determine $\epsilon$, $\delta$, and the phase rotation $\alpha 1+\theta$ and loop gain $\rho$ to determine $g$ and $\Phi$, may be performed. Additionally, due to potential mismatches in the operation of the PLLs used to generate the LO frequency in the transmitter and the sampling rate in the analog-to-digital converter in the receiver, this channel state information may vary with time and may be re-estimated at selected intervals.

To compute the channel state information for LO leakage, calibration operation may include transmitting a calibration signal in the form of a real DC signal, which upon digital down conversion produces a DC component given by:

$$r_{xi} + j r_{xq} = g_{dc} \cdot S_l \rho e^{j\alpha 1} \qquad (14)$$

In this equation, $r_{xi}$ and $r_{xq}$ are the produced DC components, $g_{dc}$ is a DC gain, and $S_l$ is the DC signal. The loop gain may thus be calculated as:

$$\rho = \frac{g_{dc} S_l}{\sqrt{r_{xi}^2 + r_{xq}^2}} \qquad (15)$$

De-rotator components may be calculated according to:

$$\cos(\alpha_1) = \frac{r_{xi}}{\sqrt{r_{xi}^2 + r_{xq}^2}} \qquad (16)$$

$$\sin(\alpha_1) = \frac{r_{xq}}{\sqrt{r_{xi}^2 + r_{xq}^2}} \qquad (17)$$

To compute the channel state information for IQ impairments, calibration operation may include transmitting a calibration signal in the form of a real tone at the image frequency, which upon digital down conversion produces a DC component given by:

$$r_{xi} + j r_{xq} = g_{dc} \cdot \rho e^{j(\alpha_1+\theta)} \qquad (18)$$

The loop gain may thus be calculated as:

$$\rho = \frac{2 g_{dc} S_l}{\sqrt{r_{xi}^2 + r_{xq}^2}} \qquad (19)$$

De-rotator components may be calculated according to:

$$\cos(\alpha_1 + \theta) = \frac{r_{xi}}{\sqrt{r_{xi}^2 + r_{xq}^2}} \qquad (20)$$

$$\sin(\alpha_1 + \theta) = \frac{r_{xq}}{\sqrt{r_{xi}^2 + r_{xq}^2}} \qquad (21)$$

Once the channel state information is calculated, correction factors $L_{ic}$, $L_{qc}$, $G_c$, $\phi_c$ to apply to transmit data can be determined and stored based on quantities determined for $\epsilon$, $\delta$, $g$, and $\Phi$ in view of the above equations. For example, iterative values for correction factors $L_{ic}(n)$, $L_{qc}(n)$ to correct for LO leakage may be calculated as a function of a current estimation of the LO leakage $L_{ir}(n)$, $L_{qr}(n)$ and previous values of these correction factors $L_{ic}(n-1)$, $L_{qc}(n-1)$. The current estimation of the LO leakage $L_{ir}(n)$, $L_{qr}(n)$ may be determined as proportional to the average real and imaginary portions of the quantity (13) above, respectively. Iterative values for correction factors $G_c(n)$, $\phi_c(n)$ to correct for IQ impairment may be calculated as a function of a current estimation of the gain and phase mismatches $G_{mm}(n)$ and $\phi_{mm}(n)$ and previous values of these correction factors $G_c(n-1)$, $\phi_c(n-1)$. The current estimation of the gain and phase mismatches $G_{mm}(n)$ and $\phi_{mm}(n)$ may be determined as proportional to the average real and imaginary portions of the quantity (12) above, respectively.

Figure 6:
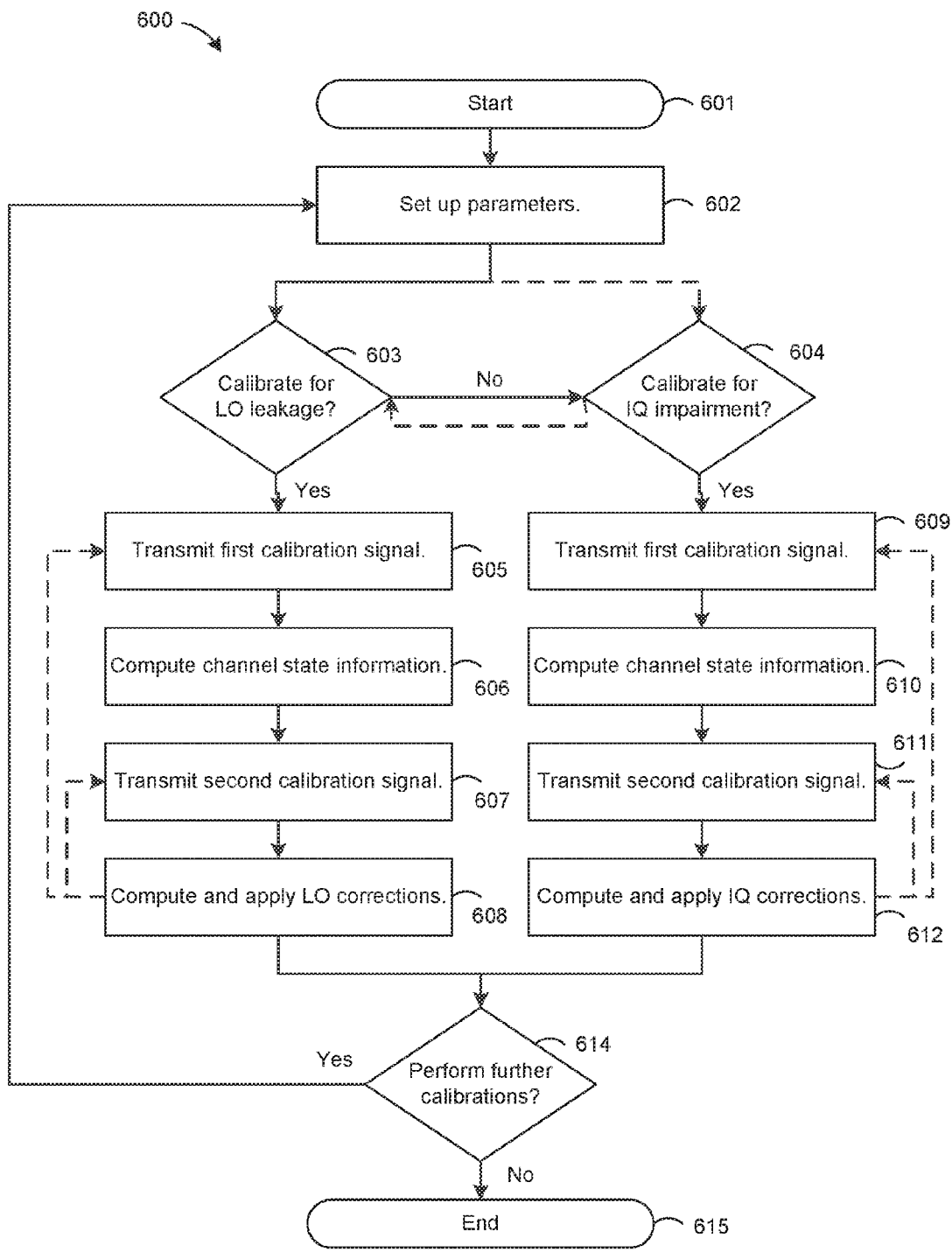
FIG. 6 is a flowchart depicting another embodiment of a method of calibrating a transmitter of the transceiver.

FIG. 6 depicts another embodiment of a method 600 of calibrating the transmitter of the transceiver to account for non-idealities such as LO leakage and IQ impairment in an improved manner. At step 601, the method may begin. At step 602, parameters may be set for the digital signal path and calibration circuit, such as with respect to, e.g., a gain setting of the transmit circuit.

At step 603, it may be determined whether to calibrate for LO leakage. This determination may be made at predetermined times, such as at a startup, mode transition, at set time points, or after set time periods, or in response to predetermined criteria, such as evaluation of a performance metric. If calibration for LO leakage is to be performed, the calibration may be conducted in a two phase process. In a first phase, at step 605 a first calibration signal may be generated, propagated through the transmit circuit 24, and looped back through the receive circuit 28. In one embodiment, the first calibration signal may be a real DC signal. A real DC signal may include a constant non-zero I component and a zero Q component. At step 606, channel state information for LO leakage calibration may be computed by the digital signal path and calibration circuit components 58, as discussed above. Using a real DC signal as the calibration signal may enable a simpler calculation of the channel state information by eliminating a phase rotation in the calibration signal and thus eliminating a need to account for an initial phase rotation of the calibration signal to determine the phase rotation of the channel state information.

In a second phase, at step 607, a second calibration signal may be generated and propagated through the transmit 24 and receive circuit 28. In one embodiment, the second calibration signal may be a complex tone. A complex tone may include I and Q components oscillating at a selected frequency. The frequency may be selected to produce upconverted calibration data at a predetermined offset from the LO frequency to minimize any impact of LO phase noise and 1/f noise at the receive circuit. At step 608, correction factors to compensate for LO leakage may be calculated, as discussed above. Using a complex tone as the calibration signal may improve the accuracy of the calculated correction factors by reducing the effect of quantization noise of the ADC 46 on the calculation, such as in comparison to the effect of such quantization noise for a real DC or complex DC calibration signal.

Upon calculating the LO leakage correction factors, the method 600 may optionally proceed back to steps 605 or 607 to transmit further calibration signals to refine the channel state information and/or LO leakage correction factor calculations. Iterative calculation of correction factors Lic, Lqc may proceed according to the following equation:

$$\begin{bmatrix} L_{ic}(n) \\ L_{qc}(n) \end{bmatrix} = \frac{\gamma}{\rho} \begin{bmatrix} \cos(\alpha) & \sin(\alpha) \\ -\sin(\alpha) & \cos(\alpha) \end{bmatrix} \begin{bmatrix} L_{ir}(n) \\ L_{qr}(n) \end{bmatrix} + \begin{bmatrix} L_{ic}(n-1) \\ L_{qc}(n-1) \end{bmatrix} \quad (22)$$

In this equation, $L_{ic}(n)$ and $L_{qc}(n)$ represents an nth iteration of the calculation of the correction factors for LO leakage; $\gamma$ represents a selected percentage applied to the current estimation to provide a system damping factor; Lir(n) and Lqr(n) represent current estimations of the LO leakage; and $L_{ic}(n)$ and $L_{qc}(n)$ represents an (n−1)th iteration of the calculation of the correction factors for LO leakage.

Once iterative refinement is complete or if such refinement is not to be performed, the method 600 may proceed to step 614. At step 614 it may be determined if further calibrations are to be performed. This determination may be made based on various factors, such as whether calibration has been performed for both LO leakage and IQ impairment, or whether calibration has been performed for each gain setting of the transmit circuit. If further calibrations are to be performed, the method 600 may return to step 602 or alternatively to steps 603 or 604 if parameters do not need to be adjusted. If further calibrations are not to be performed, the method 600 may proceed to step 615, where the method may end.

If at step 603, calibration for LO leakage is not to be performed, the method 600 may proceed to step 604. In other embodiments, the order of performance of steps 603 and 604 and corresponding subsequent steps, i.e., the order of addressing whether to preform LO leakage and IQ impairment calibration and performing such calibrations, may be reversed. In yet other embodiments, only one or the other of LO leakage or IQ impairment calibration may be performed.

At step 604, it may be determined whether to calibrate for IQ impairment. As in step 603, this determination may be made based on various considerations, such as at predetermined times, e.g., at a startup, mode transition, at set time points, or after set time periods, or in response to predetermined criteria, e.g., evaluation of a performance metric. If calibration for IQ impairment is to be performed, the calibration may be conducted in a two phase process. In a first phase, at step 609 a first calibration signal may be generated and propagated through the transmit and receive circuits 24, 28. In one embodiment, the first calibration signal may be a real tone. A real tone may include an I component oscillating at a selected frequency and a zero Q component. The frequency may be selected to produce upconverted calibration data at the image frequency for the transmit signal. At step 610, channel state information for IQ impairment calibration may be computed by the digital signal path and calibration circuit, such as the LO/IQ processing module, as discussed above. Using a real tone as the calibration signal may enable an improved calculation of the channel state information by enabling the generation of a signal at the image frequency for the transmit signal without generating a corresponding image signal for the calibration signal, as otherwise may be generated using complex tone.

In a second phase, at step 611, a second calibration signal may be generated and propagated through the transmit and receive circuits. In one embodiment, the second calibration signal may be a complex tone. A complex tone may include I and Q components oscillating at a selected frequency. The frequency may be selected to produce upconverted calibration data at a predetermined offset from the LO frequency to minimize any impact of LO phase noise and 1/f noise at the receive circuit. At step 612, correction factors to compensate for IQ impairment may be calculated, as discussed above. Using a complex tone as the calibration signal may enable an calculation of the correction factors to compensate for IQ impairment by generating image signal for the calibration signal.

Upon calculating the IQ impairment correction factors, the method may optionally proceed back to steps 609 or 611 to transmit further calibration signals to refine the channel state information and/or the IQ impairment correction factor calculations. Iterative calculation of correction factors Gc, $\phi_c$ may proceed according to the following equation:

$$\begin{bmatrix} G_c(n) \\ \varphi_c(n) \end{bmatrix} = \frac{\gamma}{\rho} \begin{bmatrix} \cos(\alpha+\theta) & \sin(\alpha+\theta) \\ -\sin(\alpha+\theta) & \cos(\alpha+\theta) \end{bmatrix} \begin{bmatrix} G_{mm}(n) \\ \varphi_{mm}(n) \end{bmatrix} + \begin{bmatrix} G_c(n-1) \\ \varphi_c(n-1) \end{bmatrix} \quad (23)$$

In this equation, $G_c(n)$ and $\phi_c(n)$ represents an nth iteration of the calculation of the gain and phase correction factors for IQ impairment; $G_{mm}(n)$ and $\phi_{mm}(n)$ represent current estimation of the gain and phase mismatches; and $G_c(n−1)$ and $\phi_c(n-1)$ represents an (n-1)th iteration of the calculation of the correction factors for IQ impairment. Once iterative refinement is complete or if such refinement is not to be performed, the method may proceed to step 614.

Other embodiments of the calibration method may change the order of, remove or add steps, such as, e.g., performing the LO and/or IQ calibration in a different and/or interleaved order.

In operation to transmit data, to perform correction of signals to be transmitted for LO leakage, the LO/IQ correction module 38 may add the correction factors for LO leakage $L_{ic}(n)$ and $L_{qc}(n)$ to uncorrected I and Q signal components, respectively. To perform correction of signals to be transmitted for IQ impairment, the LO/IQ correction module 38 may multiply the uncorrected Q component by the gain correction factor $G_c(n)$, may multiply the uncorrected I component by the phase correction factor $\phi_c(n)$, and may add these results to the uncorrected Q component, such as in addition to the Q correction factor for LO leakage $L_{qc}(n)$.

Figure 7A:
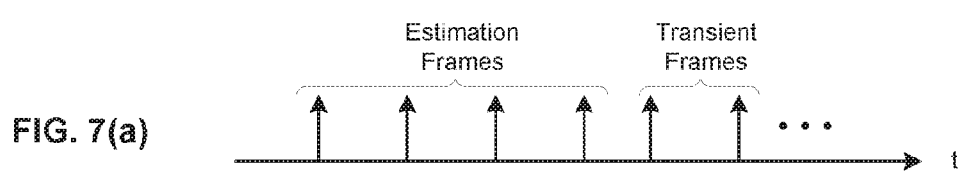
FIGS. 7(a)-7(b) are graphs depicting embodiments of framing structures for calibration data transmission.

FIG. 7(a) depicts an embodiment of a framing structure for calibration data transmission. The framing structure can include a set of n estimation frames, each including N samples, and a set of t transient frames. During the estimation frames, channel state information or LO leakage and IQ impairments may be estimated. During the transient frames, channel state information or LO/IQ correction factors may be computed and applied. In addition, transmit signaling for the next set of frames may be applied, allowing the receive data paths to be flushed to accommodate a next set of estimation frames.

Figure 7B:
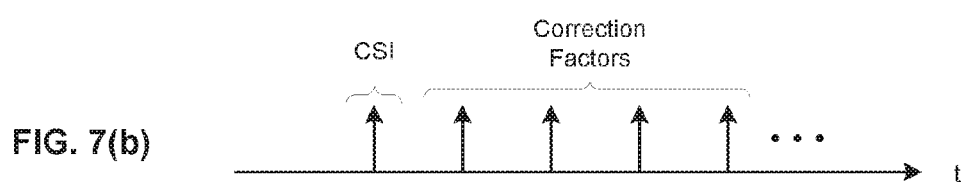

FIG. 7(b) depicts an embodiment of a time sequence of a calibration data framing structures during calibration, with a first frame structure used to estimate channel state information, a subsequent plurality of frame structures used to estimate LO/IQ correction factors, and then this sequence repeated. Other embodiments may divide framing structures between channel state information and correction factor computations differently.

Additional embodiments of the transceiver 20 and calibration methods 400, 600 are possible. For example, any feature of any of the embodiments of the transceiver 20 and calibration methods 400, 600 described herein can optionally be used in any other embodiment of the transceiver 20 and calibration methods 400, 600. Also, embodiments of the transceiver 20 and calibration methods 400, 600 can optionally include any subset of the components or features of the transceiver 20 and calibration methods 400, 600 described herein.

What is claimed is:

1. A method of operating a radio frequency transceiver, the method comprising:
   generating, by a transmit circuit of the transceiver, in-phase (I) and quadrature (Q) analog signals based on a digital calibration signal;
   mixing, by the transmit circuit, the I and Q analog signals with local oscillator (LO) and phase shifted LO signals to generate upconverted I and Q signals, the LO signal having a first frequency, and combining the upconverted I and Q signals to generate a combined signal; and
   converting, by a receive circuit of the transceiver, a signal based on the combined signal to a received digital signal using a sampling rate at a second frequency, the second frequency being less than the first frequency, wherein the converting downconverts frequency content in the combined signal.

2. The method of claim 1, further comprising calculating channel state information as a function of the received digital signal, the channel state information characterizing a channel formed by the transmit circuit, the receive circuit and a loopback circuit connecting the transmit circuit to the receive circuit, the channel state information including at least one of: a phase rotation produced by the channel, or a loop gain of the channel.

3. The method of claim 2, further comprising:
   converting a second signal based on second combined upconverted I and Q signals derived from a second calibration signal to a second received digital signal using the sampling rate at the second frequency; and
   calculating correction factors as a function of the second received digital signal and the channel state information, the correction factors correcting for at least one of: LO leakage of the transmit circuit, or IQ impairment of the transmit circuit.

4. The method of claim 3, wherein the calibration signal includes a real DC signal, the second calibration signal includes a complex tone, and the correction factors correct for LO leakage.

5. The method of claim 3, wherein the calibration signal includes a real tone, the second calibration signal includes a complex tone, and the correction factors correct for IQ impairment.

6. The method of claim 1, further comprising providing a signal based on the combined signal from the transmit circuit to an analog to digital converter of the receive circuit without mixing by the receive circuit.

7. The method of claim 3, further comprising digitally downconverting the second received digital signal to generate a DC component, wherein the calculated channel state information includes a loop gain and de-rotator components calculated as a function of the DC component.

8. The method of claim 3, further comprising framing a calibration sequence including at least one instance of the second calibration signal to calculate the channel state information, followed by a plurality of instances of the calibration signal to perform an iterative calculation of the correction factors.

9. The method of claim 1, further comprising:
   receiving, by an antenna, a transmitted signal; and
   converting, by the receive circuit, a signal based on the transmitted signal to a second digital signal using the sampling rate at the second frequency, wherein the second frequency is above a Nyquist frequency associated with the transmitted signal.

10. The method of claim 2, further comprising:
    generating, by the transmit circuit, I and Q digital signals for transmission; and
    applying the calculated correction factors to the generated I and Q digital signals.

11. A radio frequency transceiver circuit, comprising:
    a transmit circuit, including:
      a digital signal generator to generate, in-phase (I) and quadrature (Q) analog signals based on a digital calibration signal,
      a mixer to mix the I and Q analog signals with local oscillator (LO) and phase shifted LO signals to generate upconverted I and Q signals, the LO signal having a first frequency, and
      a signal combiner to combine the upconverted I and Q signals to generate a combined signal; and
    a receive circuit, including an analog to digital converter to convert a signal based on the combined signal to a received digital signal using a sampling rate at a second frequency, the second frequency being less than the first frequency, wherein the converting downconverts frequency content in the combined signal.

12. The radio frequency transceiver circuit of claim 11, further comprising a calibration circuit to calculate channel state information as a function of the received digital signal, the channel state information characterizing a channel formed by the transmit circuit, the receive circuit and a loopback circuit connecting the transmit circuit to the receive circuit, the channel state information including at least one of: phase rotation produced by the channel, or a loop gain of the channel.

13. The radio frequency transceiver circuit of claim 12, wherein the analog to digital circuit converts a second signal based on second combined upconverted I and Q signals derived from a second calibration signal to a second received digital signal using the sampling rate at the second frequency; and
the calibration circuit calculates correction factors as a function of the second received digital signal and the channel state information, the correction factors correcting for at least one of: LO leakage of the transmit circuit, or IQ impairment of the transmit circuit.

14. The radio frequency transceiver circuit of claim 13, wherein the digital calibration signal includes a real DC signal, the second digital calibration signal includes a complex tone, and the correction factor corrects for LO leakage.

15. The radio frequency transceiver circuit of claim 13, wherein the digital calibration signal includes a real tone, the second digital calibration signal includes a complex tone, and the correction factor corrects for IQ impairment.

16. The radio frequency transceiver circuit of claim 11, further comprising a loop back path to provide a signal based on the combined signal from the transmit circuit to the analog to digital converter of the receive circuit without mixing by the receive circuit.

17. The radio frequency transceiver circuit of claim 13, further comprising a digital processor to digitally downconvert the second received digital signal to generate a DC component, wherein the calculated channel state information includes a loop gain and derotator components calculated as a function of the DC component.

18. The radio frequency transceiver circuit of claim 13, further comprising a controller to frame a calibration sequence including at least one instance of the second calibration signal to calculate the channel state information, followed by a plurality of instances of the calibration signal to perform an iterative calculation of the correction factors.

19. The radio frequency transceiver circuit of claim 11, further comprising:
an amplifier to receive a transmitted signal from an antenna,
wherein the analog to digital converter converts a signal based on the transmitted signal to a second digital signal using the sampling rate at the second frequency,
wherein the second frequency is above a Nyquist frequency associated with the transmitted signal.

20. The radio frequency transceiver circuit of claim 12, wherein the digital signal generator generates I and Q digital signals for transmission, and further comprising a correction circuit to apply the calculated correction factors to the generated I and Q digital signals.

21. A radio frequency transceiver circuit, comprising:
means for generating in-phase (I) and quadrature (Q) analog signals based on a digital calibration signal;
means for mixing the I and Q analog signals with local oscillator (LO) and phase shifted LO signals to generate upconverted I and Q signals, the LO signal having a first frequency, and combining the upconverted I and Q signals to generate a combined signal; and
means for converting a signal based on the combined signal to a received digital signal using a sampling rate at a second frequency, the second frequency being less than the first frequency, wherein the converting downconverts frequency content in the combined signal.

22. The radio frequency transceiver circuit of claim 21, further comprising means for calculating channel state information as a function of the received digital signal, the channel state information characterizing a channel formed by the transmit circuit, the receive circuit and a loopback circuit connecting the transmit circuit to the receive circuit, the channel state information including at least one of: a phase rotation produced by channel, or a loop gain of the channel.

23. The radio frequency transceiver circuit of claim 22, further comprising:
means for converting a second signal based on second combined upconverted I and Q signals derived from a second calibration signal from an analog form to a second received digital signal using the sampling rate at the second frequency; and
means for calculating correction factors as a function of the second received digital signal and the channel state information, the correction factors correcting for at least one of: LO leakage of the transmit circuit, or IQ impairment of the transmit circuit.

24. The radio frequency transceiver circuit of claim 23, wherein the calibration signal includes a real DC signal, the second digital calibration signal includes a complex tone, and the correction factors correct for LO leakage.

25. The radio frequency transceiver circuit of claim 23, wherein the calibration signal includes a real tone, the second calibration signal includes a complex tone, and the correction factors correct for IQ impairment.

26. The radio frequency transceiver circuit of claim 21, further comprising means for providing a signal based on the combined signal from the transmit circuit to the means for converting without mixing.

* * * * *